United States Patent [19]
Park

[11] Patent Number: 6,039,670
[45] Date of Patent: Mar. 21, 2000

[54] POWERTRAIN FOR 5-SPEED AUTOMATIC TRANSMISSIONS

[75] Inventor: Jong-sool Park, Kyungki-do, Rep. of Korea

[73] Assignee: Hyundai Motor Company, Rep. of Korea

[21] Appl. No.: 09/081,565

[22] Filed: May 19, 1998

[30] Foreign Application Priority Data

Oct. 8, 1997 [KR] Rep. of Korea ........................ 97-51607

[51] Int. Cl.[7] .................................................. F16H 3/44
[52] U.S. Cl. ........................ 475/275; 475/280; 475/279; 475/286
[58] Field of Search ..................... 475/275–290

[56] References Cited

U.S. PATENT DOCUMENTS

| | | | |
|---|---|---|---|
| 5,885,184 | 3/1999 | Park | 475/286 |
| 5,928,102 | 7/1999 | Park | 475/286 |
| 5,944,629 | 8/1999 | Park | 477/279 |

*Primary Examiner*—Khoi Q. Ta
*Attorney, Agent, or Firm*—Finnegan, Henderson, Farabow, Garrett and Dunner, L.L.P.

[57] ABSTRACT

Disclosed is a powertrain used for a 5-speed automatic transmission. The powertrain includes a first compound planetary gearset and a second compound planetary gearset. The first compound planetary gearset comprises first and second simple planetary gearsets having first, second, third and fourth operating elements, while the second compound planetary gear unit comprises third and fourth simple planetary gearsets having fifth, sixth, seventh and eighth operating elements. The fifth and sixth operating elements are variably connected to the second and first operating elements, respectively, and said seventh operating element is fixedly connected to the fourth operating element. Clutches are disposed to variably connect the fifth and sixth operating elements to the second and first operating elements, respectively. Brakes are interposed between the fourth and eighth operating elements and a transmission housing.

42 Claims, 12 Drawing Sheets

FIG.5

| Shift Range | | C1 | C2 | B1 | B2 |
|---|---|---|---|---|---|
| R | | | | ● | ● |
| D | 1 | ● | | ● | |
| | 2 | ● | | | ● |
| | 3 | ● | ● | | |
| | 4 | | ● | | ● |
| | 5 | | ● | ● | |

6,039,670

POWERTRAIN FOR 5-SPEED AUTOMATIC TRANSMISSIONS

FIELD OF THE INVENTION

The present invention relates to a powertrain for automatic transmissions, and more particularly, to a powertrain for a 5-speed automatic transmission which can be designed to be compact in size and lightweight by reducing the number of friction elements and planetary gearsets.

BACKGROUND OF THE INVENTION

Generally, automatic transmissions include a transmission control unit (TCU) for automatically controlling shift ratios according to variations in vehicle speed and load.

The TCU controls friction elements, a plurality of which are provided in a powertrain, to ON and OFF states to select one of the three elements of a planetary gearset (sun gear, ring gear, and planet carrier) to be an input element, another a reaction element, and the last an output element, thereby controlling the number of output revolutions.

To design a powertrain so that four forward speeds and one reverse speed can be output, one compound planetary gearset, comprised of two simple planetary gearsets, and at least five friction elements are used. The compound planetary gearset is structured such that elements from one planetary gearset are integrated or shared with elements from another planetary gearset.

However, the powertrain structured as in the above has the disadvantage of having a limited number of forward speeds, i.e., four. As a result, the powertrain cannot make full use of the power provided by increasingly high-output engines. Also, the powertrain is not fuel efficient.

As a solution, there is provided a prior art powertrain having five forward speeds and one reverse speed. Such a powertrain is comprised of three simple planetary gearsets and at least six friction elements.

However, in such a powertrain for a 5-speed automatic transmission, to drive the vehicle in fourth or fifth-speed overdrive, there is a need for an element which rotates at a higher speed than that of a final output element. This results in a substantial amount of power loss. In addition, the large number of friction elements results in a heavy and large-size automatic transmission.

SUMMARY OF THE INVENTION

The present invention has been made in an effort to solve the above problems. It is an object of the present invention to provide a powertrain for a 5-speed automatic transmission which minimizes power loss by eliminating an element rotating faster than a final output element needed in the prior art when in overdrive.

It is another object of the present invention to provide a powertrain for a 5-speed automatic transmission which can be designed to be compact in size and lightweight by reducing the number of friction elements.

To achieve the above objects, the present invention provides a powertrain for a 5-speed automatic transmission. The powertrain includes a first compound planetary gearset and a second compound planetary gearset.

The first compound planetary gearset comprises first and second simple planetary gearsets having first, second, third and fourth operating elements, while the second compound planetary gear unit comprises third and fourth simple planetary gearsets having fifth, sixth, seventh and eighth operating elements. The fifth and sixth operating elements are variably connected to the second and first operating elements, respectively, and said seventh operating element is fixedly connected to the fourth operating element.

Clutches are disposed to variably connect the fifth and sixth operating elements to the second and first operating elements, respectively, and brakes are interposed between the fourth and eighth operating elements and a transmission housing.

BREIF DESCRIPTION OF THE DRAWINGS

These and other features, aspects, and advantages of the present invention will become better understood with regard to the following description, appended claims, and accompanying drawings where:

FIG. 5 is a chart illustrating the operation of friction elements in each shift range of a powertrain according to a preferred embodiment of the present invention;

DETAILED DESCRIPTION OF THE PREFERRED EMBODIMENTS

In the following detailed description, only the preferred embodiments of the invention have been shown and described, simply by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not restrictive.

Figure 1:
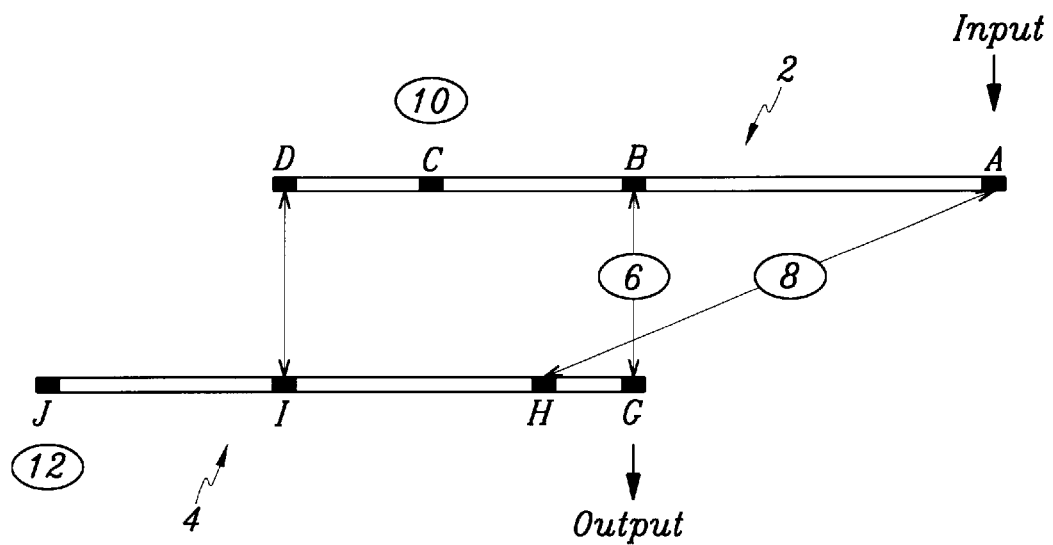
FIG. 1 is a lever analogy representation which can be obtained through powertrains according to various embodiments of the present invention.

Referring first to FIG. 1, shown is a lever analogy representation which can be obtained through powertrains according to various embodiments of the present invention. The inventive powertrain comprises first and second compound planetary gearsets 2 and 4, combined to realize five forward speeds and one reverse speed.

Each of the first and second compound planetary gearsets 2 and 4 is formed by the combination of two simple planetary gearsets, and each simple planetary gearset fixedly connects two operating elements for a total of eight operating elements arranged in two groups of four—A, B, C, D and G, H, I, J—for each of the compound planetary gearsets 2 and 4.

To combine the first and second compound planetary gearsets 2 and 4, one operating element of the first compound planetary gearset 2 is fixedly connected to one operating element of the second compound planetary gearset 4, and two operating elements of the first compound planetary gearset 2 are variably connected to two operating elements of the second compound planetary gearset 4 through clutches.

Describing in more detail, a first operating element A of the first compound planetary gearset 2 operates as an input element, and a fourth operating element D of the first compound planetary gearset 2 is fixedly connected to a third operating element I of the second compound planetary gearset 4. Further, the first operating element A of the first compound planetary gearset 2 is variably connected to a second operating element H of the second compound planetary gearset 4 through a second clutch 8, and a second operating element B of the first compound planetary gearset 2 is variably connected to a first operating element G of the second compound planetary gearset 4 through a first clutch 6, the first operating element G of the second planetary gearset 4 acting as an output element.

In addition, a third operating element C of the first compound planetary gearset 2 and a fourth J operating element of the second compound planetary gearset 4 selectively act as reacting elements by the operation of first and second brakes 10 and 12, respectively.

Figure 2:
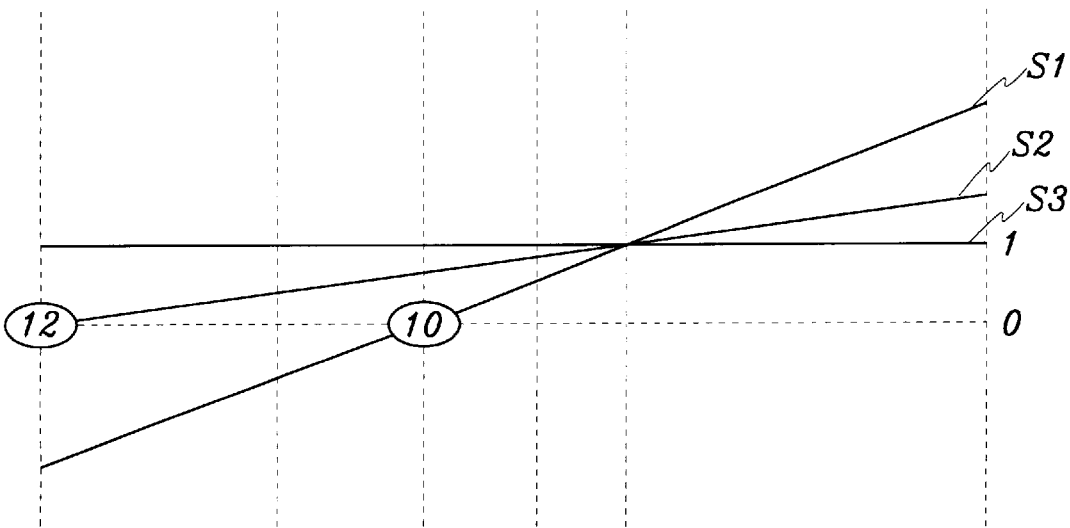
FIG. 2 is a schematic diagram illustrating an operation of forward first, second, and third speeds of a powertrain according to a preferred embodiment of the present invention through a lever analogy.

On the basis of the above description, the first and second compound planetary gearsets 2 and 4 can be merged into a single lever as shown in FIG. 2, the lever having first through sixth nodes N1, N2, N3, N4, N5, and N6 representing the operating elements A–J of the first and second compound planetary gearsets 2 and 4. The lever analogy in this drawing is used to illustrate the operation of the inventive powertrain in forward first, second, and third speeds, the first clutch 6 being engaged in all three of these speeds.

Describing in more detail with reference to the drawing, the first node N1 indicates the first operating element A of the first compound planetary gearset 2, the second node N2 indicates a combination of the second operating element B of the first compound planetary gearset 2 and the first operating element G of the second compound planetary gearset 4, the third node N3 indicates the second operating element H of the second compound planetary gearset 4, the fourth node N4 indicates the third operating element C of the first compound planetary gearset 2, the fifth node N5 indicates a combination of the fourth operating element D of the first compound planetary gearset 2 and the third operating element I of the second compound planetary gearset 4, and the sixth node J indicates the fourth operating element J of the second compound planetary gearset 4.

Figure 5:
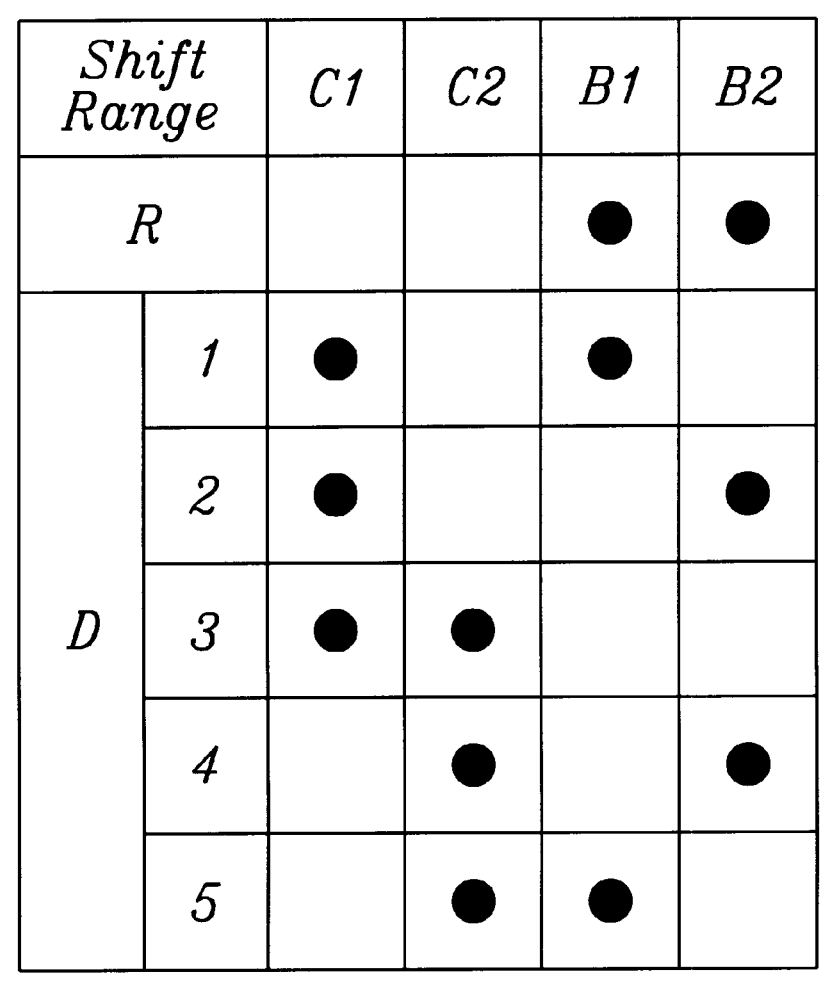

As shown in the chart of FIG. 5, illustrating which friction elements are operated in each shift range, in a forward first speed the first clutch 6 and the first brake 10 are engaged. Referring back to FIG. 2, in a state where input is realized through the first node N1, the fourth node N4 operates as a reacting element by the engagement of the first brake 10.

Also in FIG. 2, if assuming the number of output revolutions is "1", a line connecting the fourth node N4 (a reacting element) with the second node N2 (an output element) at this level of output revolutions becomes a first speed line S1. Accordingly, the number of revolutions input through the first node N1 is substantially higher than output revolutions. Also, the operating elements of the fifth and sixth nodes N5 and N6 rotate in a reverse direction in the first speed state.

Further, in the forward second speed the first brake 10 is disengaged, while the second brake 12 is operated (see FIG. 5). Here, in a state where input is realized through the first node N1, the sixth node N6 operates as a reacting element by the engagement of the second brake 12.

If assuming the number of output revolutions is "1", a line connecting the sixth node N6 (reacting element) to the second node N2 (output element) becomes a second speed line S2. As can be seen in line S2, the number of revolutions input through the first node N1 is somewhat lower compared to when in the first speed. In the second speed state, the third, fourth, and fifth nodes N3, N4, and N5 rotate in the input direction at a number of revolutions less than that of the output.

In the forward third speed the second brake 12 is disengaged, while the second clutch 8 is operated such that the two clutches 6 and 8 are engaged in this speed (see FIG. 5). Here, in a state where input is realized through the first node N1, the first and second compound planetary gearsets 2 and 4 become locked in direct drive, thereby realizing a 1:1 ratio between input and output as shown by a third speed line S3. Namely, neither gear reduction nor overdrive occurs in the third speed.

Figure 3:
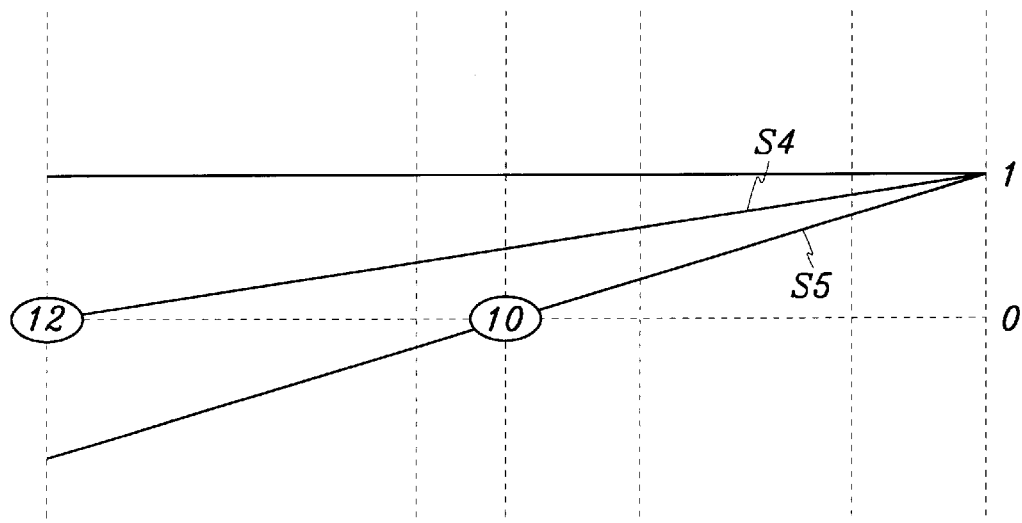
FIG. 3 is a schematic diagram illustrating an operation of forward fourth and fifth speeds of a powertrain according to a preferred embodiment of the present invention through a lever analogy.

In the forward fourth and fifth speeds, the first clutch 6 is disengaged, the second clutch 8 is engaged, and either the first or second brake 10 and 12 is engaged (see FIG. 5), and, as shown in FIG. 3, the first operating element A of the first compound planetary gearset 2 and the second operating element H of the second compound planetary gearset 4 are combined.

Accordingly, the first and second compound planetary gearsets 2 and 4 can be merged into a single lever having first to sixth nodes N1, N2, N3, N4, N5, and N6 as shown in FIG. 3.

That is, in the lever of FIG. 3, the first node N1 indicates the first operating element G of the second compound planetary gearset 4, the second node N2 indicates a combination of the first operating element A of the first compound planetary gearset 2 and the second operating element H of the second compound planetary gearset 4, the third node N3 indicates the second operating element B of the first compound planetary gearset 2, the fourth node N4 indicates the third operating element C of the first compound planetary gearset 2, the fifth node N5 indicates the fourth operating element D of the first planetary gearset 2 and the third operating element I of the second compound planetary gearset 4, and the sixth node N6 indicates the fourth operating element J of the second planetary gearset 4.

Therefore, in the fourth speed, if assuming the number of output revolutions is "1" in a state where input is realized through the second node N2, a line connecting the sixth node N6, operating as a reacting element by the operation of the second brake 12, with the first node N1, which is an output element, becomes a fourth speed line S4. Accordingly, the number of revolutions input through the second node N2 is substantially lower than output revolutions, indicating the realization of an overdrive state.

Also, because the third, fourth, and fifth nodes N3, N4, and N5 rotate at a rate slower than the output, an operating element rotating faster than the output is not needed as in the prior art such that power loss is prevented.

In the forward fifth speed, the second brake 12 is disengaged, while the first brake 10 is engaged. Accordingly, in a state where input is realized through the second node N2, if assuming the number of output revolutions is "1", a line connecting the fourth node N4, operating as a reacting element by the operation of the first brake 10, with the first node N1, operating as an output element, becomes a fifth speed line S5. Here, a fifth speed state, or an overdrive state is realized as in the forward fourth speed.

In the reverse range, the first and second clutches 6 and 8 are disengaged, while both the first and second brakes 10 and 12 are engaged. Here, the first and second compound planetary gearsets 2 and 4 can be merged into a single lever having first to sixth nodes N1, N2, N3, N4, N5, and N6 as shown in FIG. 4.

Figure 4:
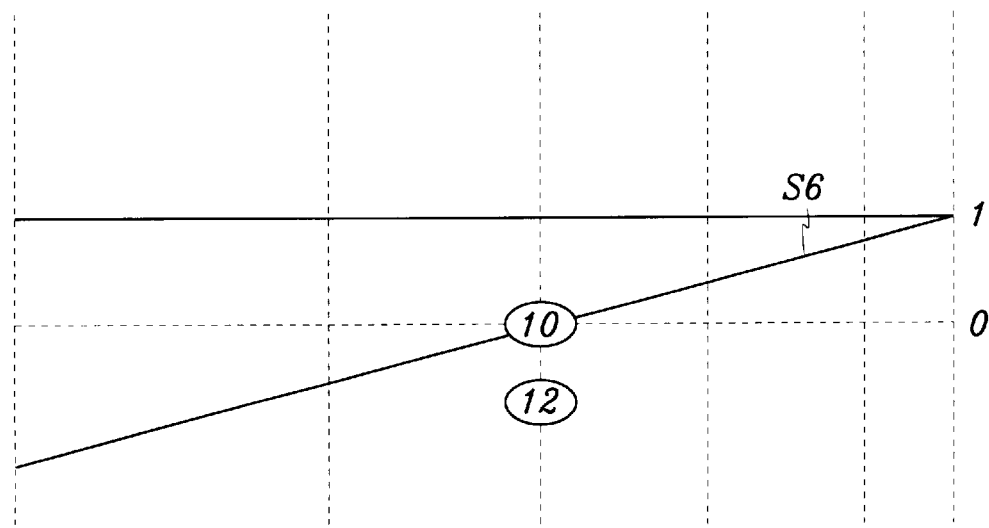
FIG. 4 is a schematic diagram illustrating an operation of a reverse speed of a powertrain according to a preferred embodiment of the present invention through a lever analogy.

Accordingly, as shown in the drawing, the third operating element C of the first compound planetary gearset 2 and the fourth operating element J of the second planetary gearset 4 act as reacting elements such that the first operating element A of the first compound planetary gearset 2 comes to be located at an opposite position in FIG. 4 when compared to the lever analogies of the forward speeds.

In the lever, the first node N1 indicates the first operating element G of the second compound planetary gearset 4, the second node N2 indicates the second operating element H of the second compound planetary gearset 4, the third node N3 indicates a combination of the fourth operating element D of the first compound planetary gearset 2 and the third operating element I of the second compound planetary gearset 4, the fourth node N4 indicates a combination of the third operating element C of the first compound planetary gearset 2 and the fourth operating element J of the second compound planetary gearset 4, the fifth node N5 indicates the second operating element B of the first planetary gearset 2, and the sixth node N6 indicates the first operating element A of the first planetary gearset 2.

Therefore, in the reverse range where input is realized through the sixth node N6 and the fourth node N4 acts as a reacting element by the engagement of the first and second brakes 10 and 12, if assuming the number of output revolutions is "1", a line connecting the fourth node N4, operating as a reacting element, with the first node N1, acting as an output element, becomes a reverse speed line S6.

In FIG. 4, input below "0" does not indicate input in the reverse direction. This is merely a result of selecting the random number of output revolution of "1".

The embodiments of the present invention operating as in the above will be explained hereinafter with reference to the drawings.

First Embodiment

Figure 6:
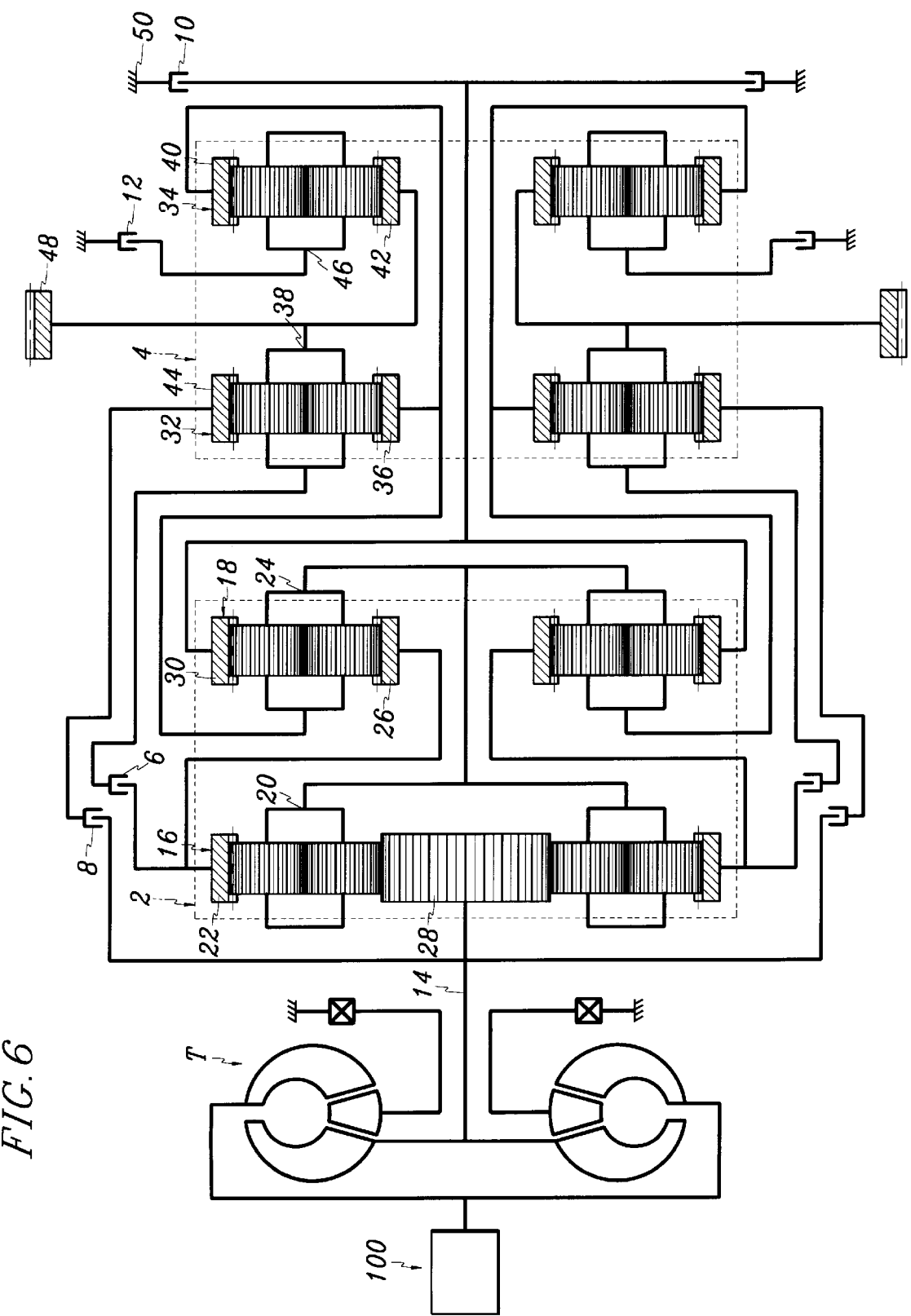
FIG. 6 is a schematic view of a powertrain according to a first preferred embodiment of the present invention.

Referring to FIG. 6, the inventive powertrain comprises an engine 100 for generating power, a torque converter T for multiplying torque generated from the engine 100, and the first and second compound planetary gearsets 2 and 4 for receiving rotational power through an input shaft 14 and for outputting five forward speeds and one reverse speed.

The first compound planetary gearset 2 is realized through the combination of a first simple planetary gearset 16 and a second simple planetary gearset 18. In the present invention, the first and second simple planetary gearsets 16 and 18 are double pinion planetary gearsets.

A planet carrier 20 and a ring gear 22 of the first simple planetary gearset 16 are fixedly connected respectively to a planet carrier 24 and a sun gear 26 of the second simple planetary gearset 18. Together with these two connections, and a sun gear 28 of the first simple planetary gearset 16, operating as an input element, and a ring gear 30 of the second simple planetary gearset 18, four operating elements are provided.

The second compound planetary gearset 4 is realized through the combination of a third simple planetary gearset 32 and a fourth simple planetary gearset 34, both of which are double pinion planetary gearsets.

A sun gear 36 and a planet carrier 38 of the third simple planetary gearset 32 are fixedly connected respectively to a ring gear 40 and a sun gear 42 of the fourth simple planetary gearset 34. Together with these two connections, and a ring gear 44 of the third simple planetary gearset 32 and a planet carrier 46 of the fourth simple planetary gearset 34, there are provided four operating elements.

With regard to the combination of the first and second compound planetary gearsets 2 and 4, both the planet carriers 20 and 24 of the first and second simple planetary gearsets 16 and 18 are fixedly connected to both the sun gear 36 and ring gear 40 of the third and fourth simple planetary gearsets 32 and 34, both the ring gear 22 and sun gear 26 of the first and second simple planetary gearsets 16 and 18 are variably connected to both the planet carrier 38 and sun gear 42 of the third and fourth simple planetary gearsets 32 and 34, and the sun gear 28 of the first simple planetary gearset 16 is variably connected to the ring gear 44 of the third simple planetary gearset 32.

Accordingly, the sun gear 28 of the first simple planetary gearset 16 acts as an input element, while the planet carrier 38 of the third simple planetary gearset 32 and the sun gear 42 of the fourth simple planetary gearset 32, fixedly connected to each other, are integrally formed with an output gear 48 such that the planet carrier 38 and the sun gear 42 act as output elements.

Here, because the structure and operation of the output gear 48 is well known, i.e., its differential function through a final reduction gear, an explanation thereof and illustration in FIG. 6 have been omitted.

Further, the above variable connections are realized through first and second clutches 6 and 8. Namely, the first clutch 6 connects both the ring gear 22 and sun gear 26 of the first and second simple planetary gearsets 16 and 18 to both the planet carrier 38 and sun gear 42 of the third and fourth planetary gearsets 32 and 36 when in the forward first, second, and third speeds; while the second clutch 8 connects the sun gear 28 of the first simple planetary gearset 16 to the ring gear 44 of the third simple planetary gearset 32 in the forward third, fourth, and fifth speeds.

Also, the first and second brakes 10 and 12 are provided to selectively enable at least one of the operating elements of the first and second compound planetary gearsets 2 and 4 to act as a reaction element. Namely, the first brake 10 connects the ring gear 30 of the second simple planetary gear set 18 to a transmission housing 50 in the forward first and fifth speeds and in reverse, and the second brake 12 connects the planet carrier 46 of the fourth simple planetary gearset 34 to the transmission housing 50 in the forward second and fourth speeds and in reverse.

Referring back to FIG. 1, with regard to the first compound planetary gearset 2, the first operating element A indicates the sun gear 28 of the first simple planetary gearset 16, the second operating element B indicates a combination of the ring gear 22 and sun gear 28 of the first and second simple planetary gearset 22 and 26, the third operating element C indicates the ring gear 30 of the second simple planetary gearset 18, and the fourth operating element D indicates a combination of the planet carriers 20 and 24 of the first and second simple planetary gearsets 16 and 18.

With regard to the second compound planetary gearset 4, the first operating element G indicates a combination of the planet carrier 38 and sun gear 42 of the third and fourth simple planetary gearset 32 and 34, the second operating element H indicates the ring gear 44 of the third simple planetary gearset 32, the third operating element I indicates a combination of the planet carrier 36 and ring gear 40 of the third and fourth simple planetary gearsets 32 and 34, and the fourth operating element J indicates the planet carrier 46 of the fourth simple planetary gearset 34.

The establishment of each operating element is determined by the type of planetary gear unit and connecting structure. In the above, as the determining of the structural elements of the first through fourth operating elements of the first and second planetary gearsets 2 and 4 by the combination of the first and second simple planetary gearsets 16 and 18, and the combination of the third and fourth simple planetary gearsets 32 and 34 is well known to those skilled in the art, a detailed description thereof is omitted.

The first and second compound planetary gearsets 2 and 4, each having four operating elements as in the above, can be merged into a single lever as shown in FIG. 2, the lever having first through fifth nodes N1, N2, N3, N4, and N5 representing the operating elements of the first and second compound planetary gearsets 2 and 4. The lever analogy in this drawing is used to illustrate the operation of the inventive powertrain in forward first, second, and third speeds, the first clutch 6 being engaged in all three of these speeds.

The breakdown of which operating elements each node represents is as follows: the first node N1 indicates the first operating element A of the first compound planetary gearset 2, the second node N2 indicates a combination of the second operating element B of the first compound planetary gearset 2 and the first operating element G of the second compound planetary gearset 4, the third node N3 indicates the second operating element H of the second compound planetary gearset 4, the fourth node N4 indicates the third operating element C of the first compound planetary gearset 2, the fifth node N5 indicates a combination of the fourth operating element D of the first compound planetary gearset 2 and the third operating element I of the second compound planetary gearset 4, and the sixth node N6 indicates the fourth operating element J of the second compound planetary gearset 4.

Forward First Speed

In the forward first speed, the first clutch 6 and the first brake 10 are engaged. Here, in a state where input is realized through the sun gear 28 of the second simple planetary gearset 18, or the first node N1, the ring gear 30 of the second simple planetary gearset 18, or the fourth node N4, acts as a reaction element by the operation of the first brake 10.

Accordingly, as shown in FIG. 2, if assuming that the number of output revolutions is "1", the line connecting the fourth node N4, or reacting element, to the second node N2, or output element, becomes the first speed line S1 such that the number of revolutions input through the first node N1 is substantially higher than output revolutions.

Further, in the first speed state, the operating elements represented by the fifth and sixth nodes N5 and N6 rotate in an opposite direction as the remaining operating elements, as shown by the fact that the line S1 corresponding to locations of the fifth and sixth nodes N5 and N6 extends beneath "0" in the drawing.

Forward Second Speed

In the forward second speed, the first brake 10 is disengaged, while the second brake 12 is engaged. Here, in a state where input is realized through the first node N1, the sun gear 42 of the fourth simple planetary gearset 34, or the sixth node N6 acts as a reaction element by the operation of the second brake 12.

Accordingly, as shown in FIG. 2, if assuming that the number of output revolutions is "1", the line connecting the sixth node N6, or reacting element, to the second node N2, or output element, becomes the second speed line S2 such that the number of revolutions input is less than that of the first speed.

Further, in the second speed state, although the operating elements of the third, fourth, and fifth nodes N3, N4, and N5 rotate in an identical direction with the input direction, they rotate at a speed slower than that of the output.

Forward Third Speed

In the forward third speed, the second brake 12 is disengaged, while the second clutch 8 is engaged such that both clutches 6 and 8 are operating. Here, in a state where input is realized through the first node N1, the first and second compound planetary gearsets 2 and 4 become locked in direct drive such that a 1:1 ratio is realized between input and output. That is, neither a state of gear reduction nor overdrive is realized.

Forward Fourth Speed

In the forward fourth and fifth speeds, the first clutch 6 is disengaged, the second clutch 8 is engaged, and either the first or second brake 10 and 12 is engaged. As a result, the first operating element A of the first compound planetary gearset 2 and the second operating element H of the second compound planetary gearset 4 are combined.

Accordingly, the first and second compound planetary gearsets 2 and 4 can be merged into a single lever having first to sixth nodes N1, N2, N3, N4, N5, and N6 as shown in FIG. 3. That is, in the lever of FIG. 3, the first node N1 indicates the first operating element G of the second compound planetary gearset 4, the second node N2 indicates a combination of the first operating element A of the first compound planetary gearset 2 and the second operating element H of the second compound planetary gearset 4, the third node N3 indicates the second operating element B of the first compound planetary gearset 2, the fourth node N4 indicates the third operating element C of the first compound planetary gearset 2, the fifth node N5 indicates a combination of the fourth operating element D of the first planetary gearset 2 and the third operating element I of the second compound planetary gearset 4, and the sixth node N6 indicates the fourth operating element J of the second planetary gearset 4.

Therefore, in the fourth speed, if assuming the number of output revolutions is "1" in a state where input is realized through the second node N2, a line connecting the sixth node N6, operating as a reacting element by the operation of the second brake 12, with the first node N1, operating as an output element, becomes a fourth speed line S4. Thus, as shown in the fourth speed line S4, the number of revolutions input through the second node N2 is substantially lower than output revolutions, indicating the realization of an overdrive state.

Also, in the fourth speed state, because the third, fourth, and fifth nodes N3, N4, and N5 rotate at a rate slower than the output, an operating element rotating faster than the output is not needed as in the prior art such that power loss is prevented.

Forward Fifth Speed

In the forward fifth speed, the second brake 12 is disengaged, while the first brake 10 is engaged. Accordingly, in a state where input is realized through the second node N2, if assuming the number of output revolutions is "1", a line connecting the fourth node N4, operating as a reacting element by the operation of the first brake 10, with the first node N1, operating as an output element, becomes a fifth speed line S5. Here, an overdrive state is realized as in the forward fourth speed.

Reverse

In the reverse range, the first and second clutches 6 and 8 are disengaged, while the first and second brakes 10 and 12 are engaged. Accordingly, as shown in FIG. 4, the third operating element C of the first compound planetary gearset 2 and the fourth operating element J of the second planetary gearset 4 become reacting elements such that the first operating element A of the first compound planetary gearset 2 comes to be located at an opposite position in the lever of FIG. 4, the lever having first to sixth nodes N1, N2, N3, N4, N5, and N6.

In the lever, the first node N1 indicates the first operating element G of the second compound planetary gearset 4, the second node N2 indicates the second operating element H of the second compound planetary gearset 4, the third node N3 indicates a combination of the fourth operating element D of the first compound planetary gearset 2 and the third operating element I of the second compound planetary gearset 4, the fourth node N4 indicates a combination of the third operating element C of the first compound planetary gearset 2 and the fourth operating element J of the second compound planetary gearset 4, the fifth node N5 indicates the second operating element B of the first planetary gearset 2, and the sixth node N6 indicates the first operating element A of the first planetary gearset 2.

Therefore, in the reverse range where input is realized through the sixth node N6 and the fourth node N4 acts as a reacting element by the engagement of the first and second brakes 10 and 12, if assuming the number of output revolutions is "1", a line connecting the fourth node N4, operating as a reacting element, with the first node N1 becomes a reverse speed line S6.

In FIG. 4, input below "0" does not indicate input in the reverse direction. This is merely a result of selecting the random number of output revolutions at

Second Embodiment

Figure 7:
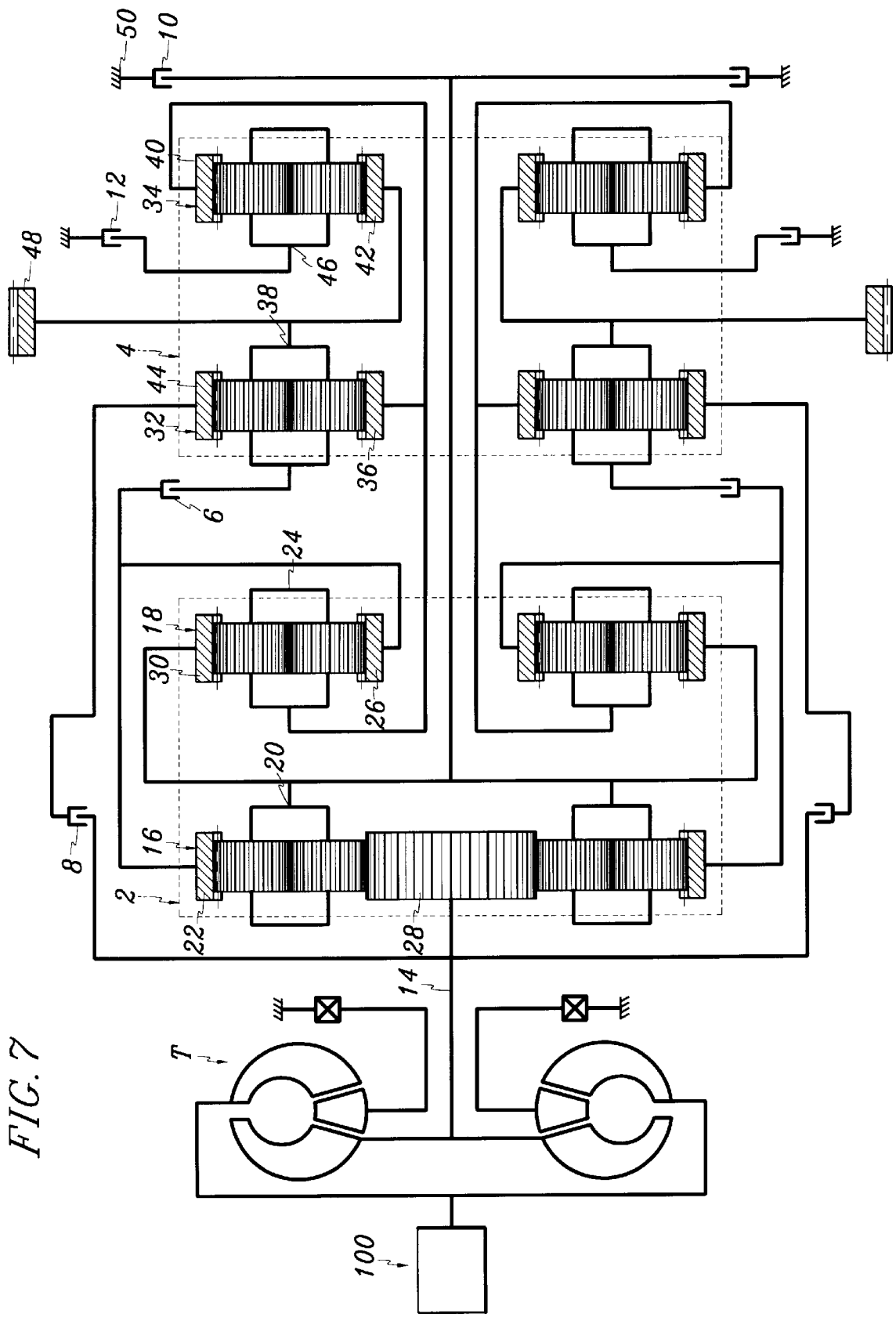
FIG. 7 is a schematic view of a powertrain according to a second preferred embodiment of the present invention.

Referring to FIG. 7, shown is a schematic view of a powertrain according to a second preferred embodiment of the present invention. In the second embodiment, both the first and second compound planetary gearsets 16 and 18 are double pinion planetary gearsets as in the first embodiment. As shown in the drawing, the planet carrier 20 and ring gear 22 of the first simple planetary gearset 16 are fixedly connected respectively to the ring gear 30 and sun gear 26 of the second simple planetary gearset 18.

Further, with regard to the combination of the first and second compound planetary gearsets 2 and 4, the planet carrier 24 of the second simple planetary gearset 18 is fixedly connected to the sun gear 36 and ring gear 40 of the third and fourth simple planetary gearsets 32 and 34, both the ring gear 22 and sun gear 26 of the first and second simple planetary gearsets 16 and 18 are variably connected to both the planet carrier 38 and sun gear 42 of the third and fourth simple planetary gearsets 32 and 34 through the first clutch 6, and the sun gear 28 of the first simple planetary gearset 16 is variably connected to the ring gear 44 of the third simple planetary gearset 32 through the second clutch 8.

Also, the planet carrier 20 and ring gear 30 of the first and second simple planetary gearsets 16 and 18 are connected to the transmission housing 50 with the first brake 10 interposed therebetween such that the planet carrier 20 and ring gear 30 can selectively act as reacting elements. In addition, the sun gear 28 of the first simple planetary gearset 16 acts as an input element.

According to the above structure, operating elements for the first compound planetary gearset 2 in the lever analogies of FIGS. 1–4 are as follows: the first operating element A indicates the sun gear 28 of the first simple planetary gearset 16, the second operating element B indicates a combination of the ring gear 22 and sun gear 26 of the first and second simple planetary gearsets 16 and 18, the third operating element C indicates the planet carrier 20 of the first simple planetary gearset 16, and the fourth operating element D indicates the planet carrier 24 of the second simple planetary gearset 18.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the second embodiment, only the structure of the first compound planetary gearset 4 is changed from the first embodiment. As the operation of the operating elements in each shift range is identical to that of the first embodiment, an explanation thereof will be omitted herein.

Third Embodiment

Figure 8:
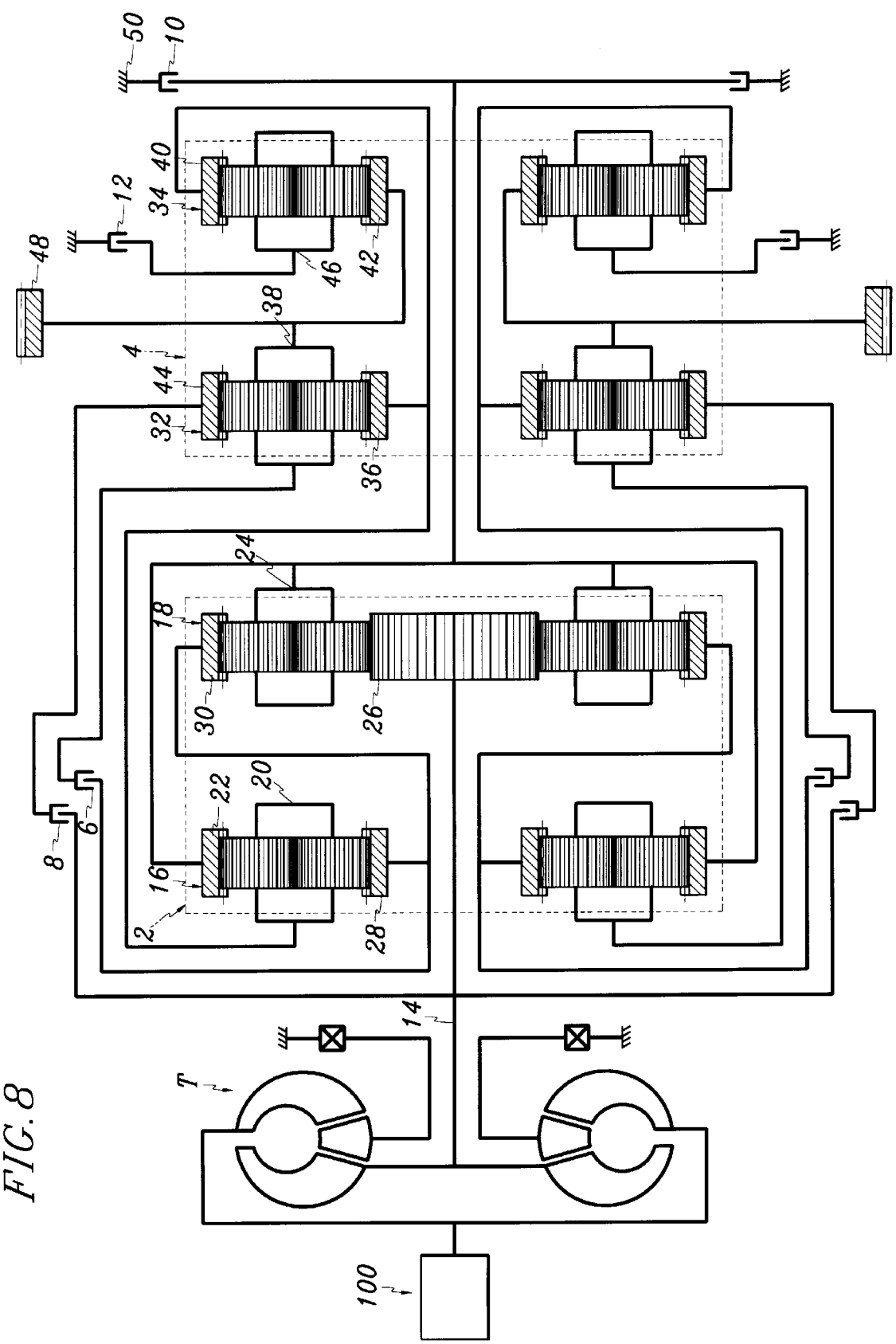
FIG. 8 is a schematic view of a powertrain according to third preferred embodiment of the present invention.

Referring to FIG. 8, shown is a schematic view of a powertrain according to a third preferred embodiment of the present invention. In the third embodiment, both the first and second compound planetary gearsets 16 and 18 are double pinion planetary gearsets as in the first embodiment. As shown in the drawing, the sun gear 28 and ring gear 22 of the first simple planetary gearset 16 are fixedly connected respectively to the ring gear 30 and planet carrier 24 of the second simple planetary gearset 18.

Further, with regard to the combination of the first and second compound planetary gearsets 2 and 4, the planet carrier 20 of the first simple planetary gearset 18 is fixedly connected to the sun gear 36 and ring gear 40 of the third and fourth simple planetary gearsets 32 and 34, both the sun gear 28 and ring gear 30 of the first and second simple planetary gearsets 16 and 18 are variably connected to both the planet carrier 38 and sun gear 42 of the third and fourth simple planetary gearsets 32 and 34 through the first clutch 6, and the sun gear 26 of the second simple planetary gearset 18 is variably connected to the ring gear 44 of the third simple planetary gearset 32 through the second clutch 8.

Also, the ring gear 22 and planet carrier 24 of the first and second simple planetary gearsets 16 and 18 are connected to the transmission housing 50 with the first brake 10 interposed therebetween such that the ring gear 22 and planet carrier 24 can selectively act as reacting elements. In addition, the sun gear 26 of the second simple planetary gearset 18 acts as an input element.

According to the above structure, operating elements for the first compound planetary gearset 2 in the lever analogies of FIGS. 1–4 are as follows: the first operating element A indicates the sun gear 26 of the second simple planetary gearset 18, the second operating element B indicates a combination of the sun gear 28 and ring gear 30 of the first and second simple planetary gearsets 16 and 18, the third operating element C indicates the a combination of the ring gear 22 and planet carrier 24 of the first and second simple planetary gearsets 16 and 18, and the fourth operating element D indicates the planet carrier 20 of the first simple planetary gearset 16.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the third embodiment, only the structure of the first compound planetary gearset 4 is changed from the first embodiment. As the operation of the operating elements in each shift range is identical to that of the first embodiment, an explanation thereof will be omitted herein.

Fourth Embodiment

Figure 9:
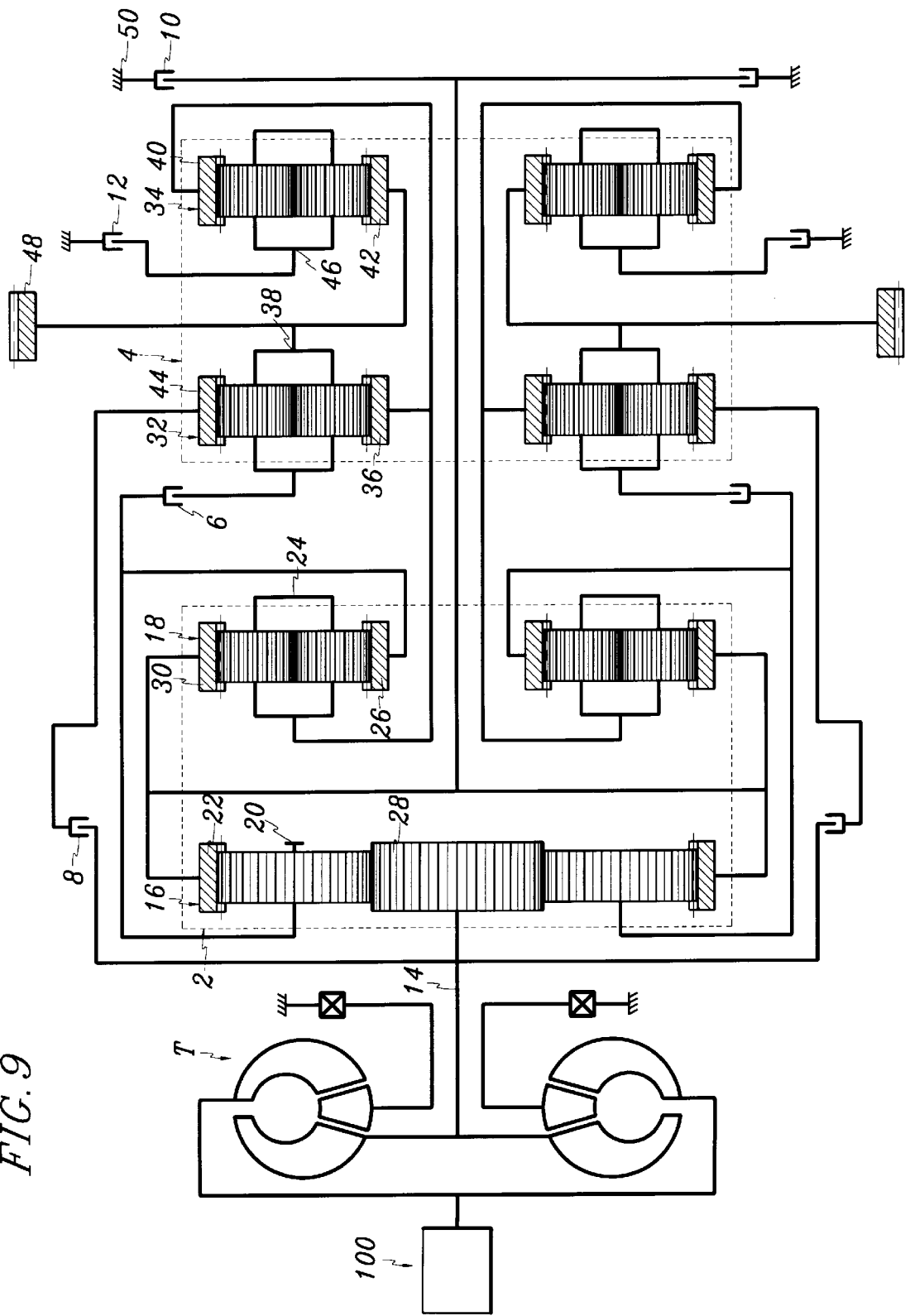
FIG. 9 is a schematic view of a powertrain according to a fourth preferred embodiment of the present invention.

Referring to FIG. 9, shown is a schematic view of a powertrain according to a fourth preferred embodiment of the present invention. In the fourth embodiment, the first compound planetary gearset 16 is a single pinion planetary gearset, while the second compound planetary gearset 18 is a double pinion planetary gearset as in the first embodiment. As shown in the drawing, the planet carrier 20 and ring gear 22 of the first simple planetary gearset 16 are fixedly connected respectively to the sun gear 26 and ring gear 30 of the second simple planetary gearset 18.

Further, with regard to the combination of the first and second compound planetary gearsets 2 and 4, the planet carrier 24 of the second simple planetary gearset 18 is fixedly connected to the sun gear 36 and ring gear 40 of the third and fourth simple planetary gearsets 32 and 34, both the planet carrier 20 and sun gear 26 of the first and second simple planetary gearsets 16 and 18 are variably connected to both the planet carrier 38 and sun gear 42 of the third and fourth simple planetary gearsets 32 and 34 through the first clutch 6, and the sun gear 28 of the first simple planetary gearset 16 is variably connected to the ring gear 44 of the third simple planetary gearset 32 through the second clutch 8.

Also, the ring gears 22 and 30 of the first and second simple planetary gearsets 16 and 18 are connected to the transmission housing 50 with the first brake 10 interposed therebetween such that the ring gears 22 and 30 can selectively act as reacting elements. In addition, the sun gear 28 of the first simple planetary gearset 16 acts as an input element.

According to the above structure, operating elements for the first compound planetary gearset 2 in the lever analogies of FIGS. 1–4 are as follows: the first operating element A indicates the sun gear 28 of the first simple planetary gearset 16, the second operating element B indicates a combination of the planet carrier 20 and sun gear 26 of the first and second simple planetary gearsets 16 and 18, the third operating element C indicates a combination of the ring gears 22 and 30 of the first and second simple planetary gearsets 16 and 18, and the fourth operating element D indicates the planet carrier 24 of the second simple planetary gearset 18.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the fourth embodiment, only the structure of the first compound planetary gearset 4 is changed from the first embodiment. As the operation of the operating elements in each shift range is identical to that of the first embodiment, an explanation thereof will be omitted herein.

Fifth Embodiment

Figure 10:
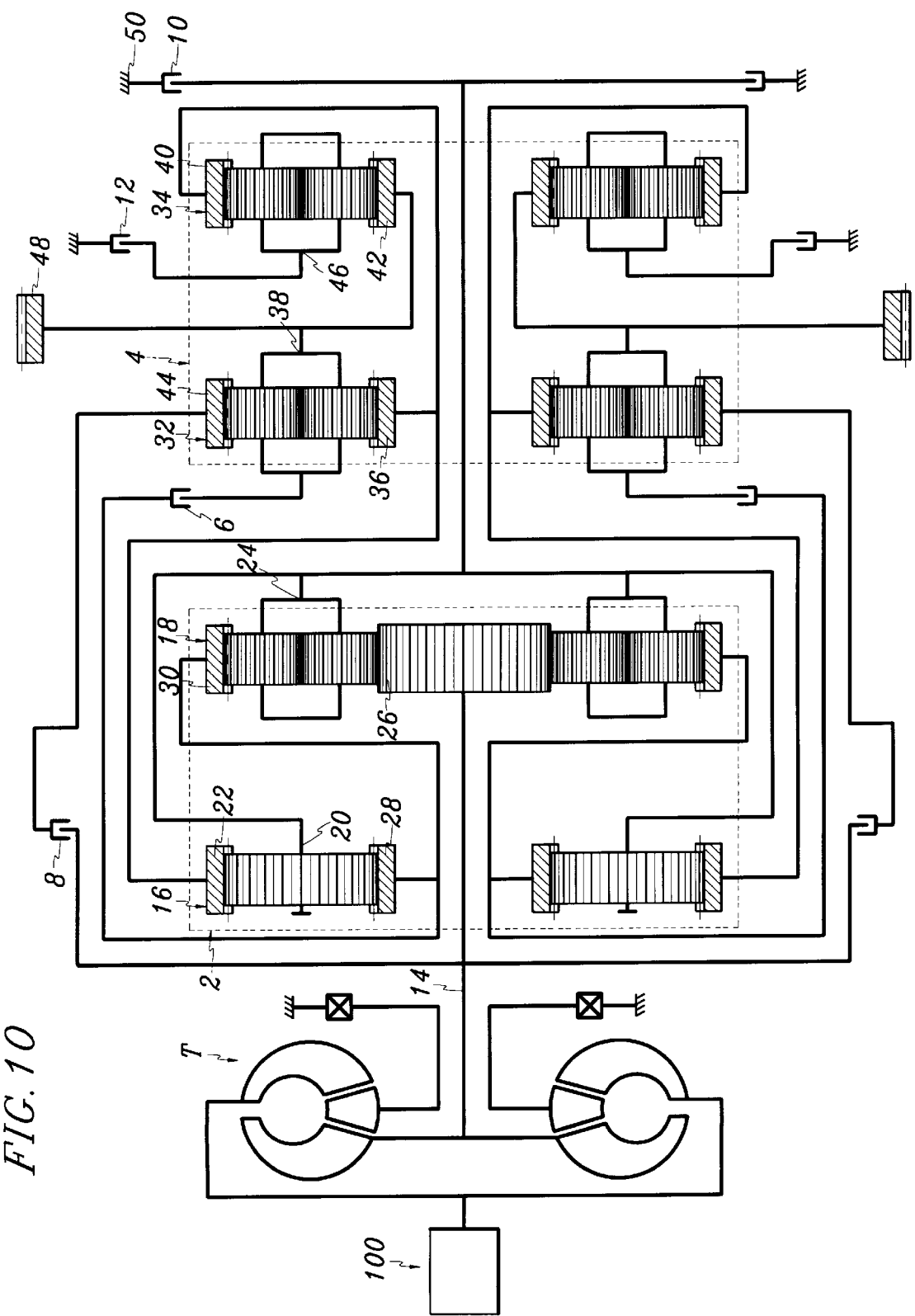
FIG. 10 is a schematic view of a powertrain according to a fifth preferred embodiment of the present invention.

Referring to FIG. 10, shown is a schematic view of a powertrain according to a fifth preferred embodiment of the present invention. In the fifth embodiment, the first compound planetary gearset 16 is a single pinion planetary gearset, while the second compound planetary gearset 18 is a double pinion planetary gearset as in the first embodiment. As shown in the drawing, the sun gear 28 and planet carrier 20 of the first simple planetary gearset 16 are fixedly connected respectively to the ring gear 30 and planet carrier 24 of the second simple planetary gearset 18.

Further, with regard to the combination of the first and second compound planetary gearsets 2 and 4, the ring gear 22 of the first simple planetary gearset 16 is fixedly connected to the sun gear 36 and ring gear 40 of the third and fourth simple planetary gearsets 32 and 34, both the sun gear 28 and ring gear 30 of the first and second simple planetary gearsets 16 and 18 are variably connected to both the planet carrier 38 and sun gear 42 of the third and fourth simple planetary gearsets 32 and 34 through the first clutch 6, and the sun gear 26 of the second simple planetary gearset 18 is variably connected to the ring gear 44 of the third simple planetary gearset 32 through the second clutch 8.

Also, the planet carriers 20 and 24 of the first and second simple planetary gearsets 16 and 18 are connected to the transmission housing 50 with the first brake 10 interposed therebetween such that the planet carriers 20 and 24 can selectively act as reacting elements. In addition, the sun gear 26 of the second simple planetary gearset 16 acts as an input element.

According to the above structure, operating elements for the first compound planetary gearset 2 in the lever analogies of FIGS. 1–4 are as follows: the first operating element A indicates the sun gear 26 of the second simple planetary gearset 18, the second operating element B indicates a combination of the sun gear 28 and ring gear 30 of the first and second simple planetary gearsets 16 and 18, the third operating element C indicates a combination of the planet carriers 20 and 24 of the first and second simple planetary gearsets 16 and 18, and the fourth operating element D indicates the ring gear 22 of the first simple planetary gearset 16.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the fifth embodiment, only the structure of the first compound planetary gearset 4 is changed from the first embodiment. As the operation of the operating elements in each shift range is identical to that of the first embodiment, an explanation thereof will be omitted herein.

Sixth Embodiment

Figure 11:
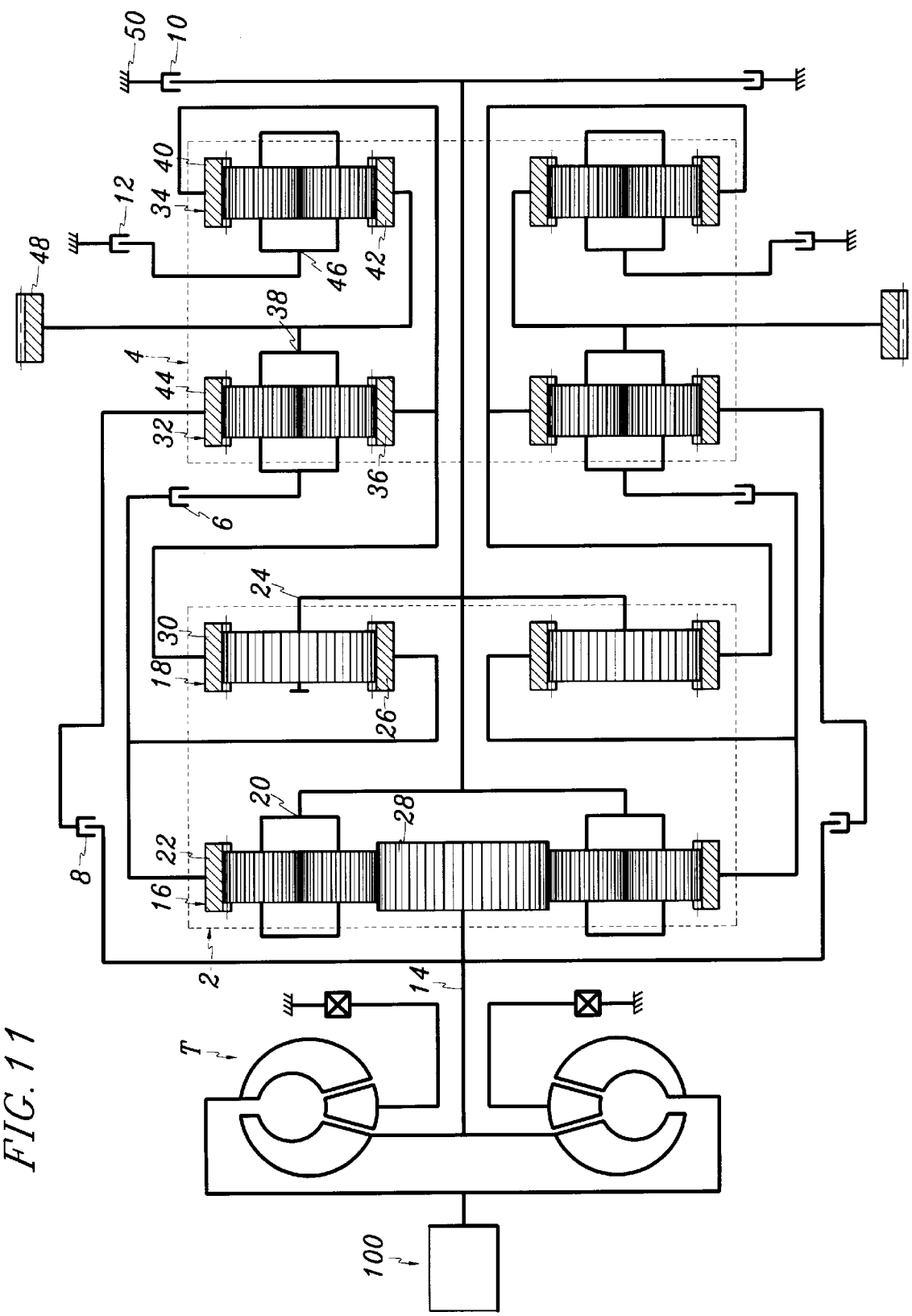
FIG. 11 is a schematic view of a powertrain according to sixth preferred embodiment of the present invention.

Referring to FIG. 11, shown is a schematic view of a powertrain according to a sixth preferred embodiment of the present invention. In the sixth embodiment, the first compound planetary gearset 16 is a double pinion planetary gearset as in the first embodiment, while the second compound planetary gearset 18 is a single pinion planetary gearset. As shown in the drawing, the planet carrier 20 and ring gear 22 of the first simple planetary gearset 16 are fixedly connected respectively to the planet carrier 24 and sun gear 26 of the second simple planetary gearset 18.

Further, with regard to the combination of the first and second compound planetary gearsets 2 and 4, the ring gear 30 of the second simple planetary gearset 18 is fixedly connected to the sun gear 36 and ring gear 40 of the third and fourth simple planetary gearsets 32 and 34, both the ring gear 22 and sun gear 26 of the first and second simple planetary gearsets 16 and 18 are variably connected to both the planet carrier 38 and sun gear 42 of the third and fourth simple planetary gearsets 32 and 34 through the first clutch 6, and the sun gear 28 of the first simple planetary gearset 16 is variably connected to the ring gear 44 of the third simple planetary gearset 32 through the second clutch 8.

Also, the planet carriers 20 and 24 of the first and second simple planetary gearsets 16 and 18 are connected to the transmission housing 50 with the first brake 10 interposed therebetween such that the planet carriers 20 and 24 can selectively act as reacting elements. In addition, the sun gear 28 of the first simple planetary gearset 16 acts as an input element.

According to the above structure, operating elements for the first compound planetary gearset 2 in the lever analogies of FIGS. 1–4 are as follows: the first operating element A indicates the sun gear 28 of the first simple planetary gearset 16, the second operating element B indicates a combination of the ring gear 22 and sun gear 26 of the first and second simple planetary gearsets 16 and 18, the third operating element C indicates a combination of the planet carriers 20 and 24 of the first and second simple planetary gearsets 16 and 18, and the fourth operating element D indicates the ring gear 30 of the second simple planetary gearset 18.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the sixth embodiment, only the structure of the first compound planetary gearset 4 is changed from the first embodiment. As the operation of the operating elements in each shift range is identical to that of the first embodiment, an explanation thereof will be omitted herein.

Seventh Embodiment

Figure 12:
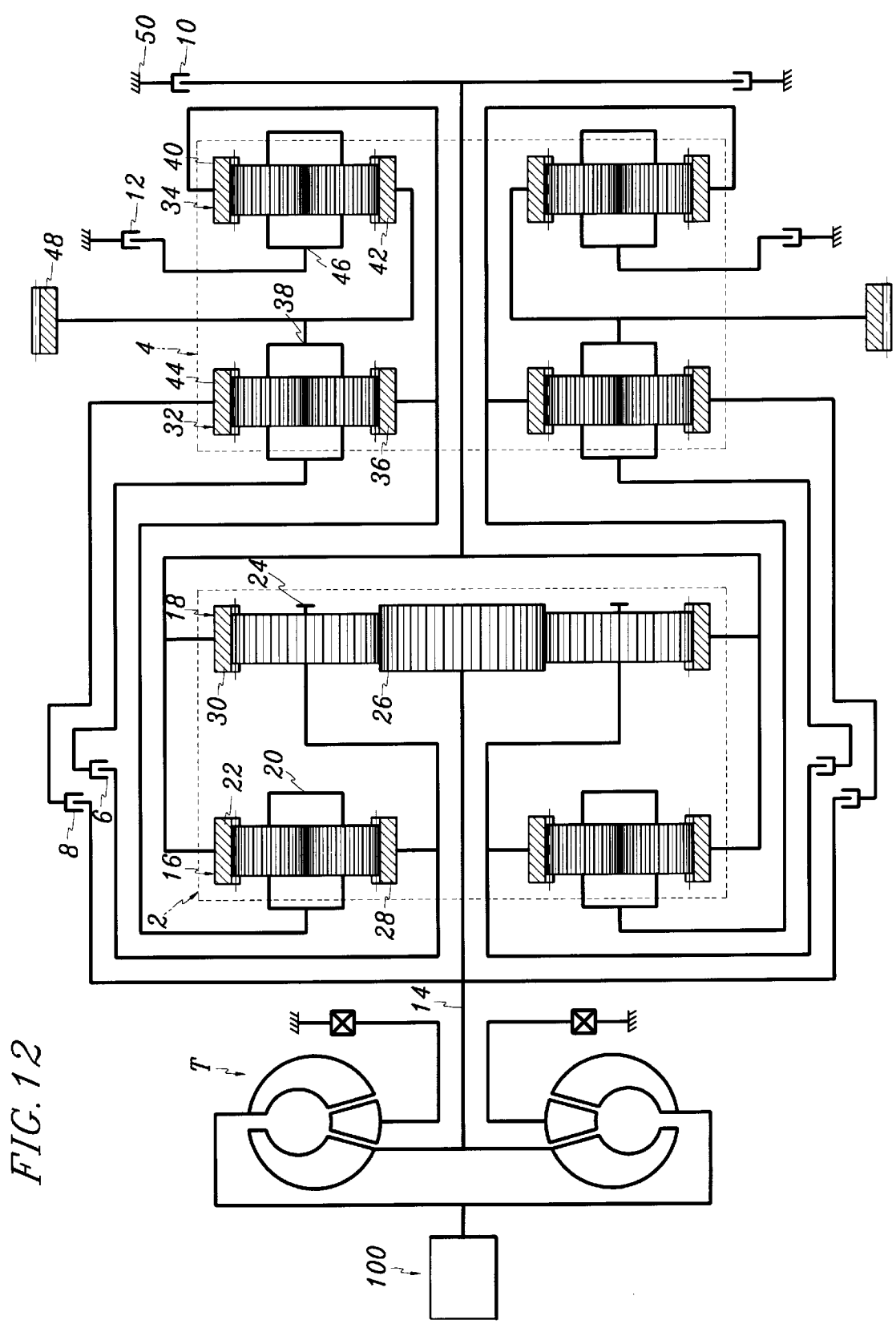
FIG. 12 is a schematic view of a powertrain according to a seventh preferred embodiment of the present invention.

Referring to FIG. 12, shown is a schematic view of a powertrain according to a seventh preferred embodiment of the present invention. In the seventh embodiment, the first compound planetary gearset 16 is a double pinion planetary gearset as in the first embodiment, while the second compound planetary gearset 18 is a single pinion planetary gearset. As shown in the drawing, the sun gear 28 and ring gear 22 of the first simple planetary gearset 16 are fixedly connected respectively to the planet carrier 24 and ring gear 30 of the second simple planetary gearset 18.

Further, with regard to the combination of the first and second compound planetary gearsets 2 and 4, the planet carrier 20 of the first simple planetary gearset 16 is fixedly connected to the sun gear 36 and ring gear 40 of the third and fourth simple planetary gearsets 32 and 34, both the sun gear 28 and planet carrier 24 of the first and second simple planetary gearsets 16 and 18 are variably connected to both the planet carrier 38 and sun gear 42 of the third and fourth simple planetary gearsets 32 and 34 through the first clutch 6, and the sun gear 26 of the second simple planetary gearset 18 is variably connected to the ring gear 44 of the third simple planetary gearset 32 through the second clutch 8.

Also, the ring gears 22 and 30 of the first and second simple planetary gearsets 16 and 18 are connected to the transmission housing 50 with the first brake 10 interposed therebetween such that the ring gears 22 and 30 can selectively act as reacting elements. In addition, the sun gear 26 of the second simple planetary gearset 18 acts as an input element.

According to the above structure, operating elements for the first compound planetary gearset 2 in the lever analogies of FIGS. 1–4 are as follows: the first operating element A indicates the sun gear 26 of the second simple planetary gearset 18, the second operating element B indicates a combination of the sun gear 28 and planet carrier 24 of the first and second simple planetary gearsets 16 and 18, the third operating element C indicates a combination of the ring gears 22 and 30 of the first and second simple planetary gearsets 16 and 18, and the fourth operating element D indicates the planet carrier 20 of the first simple planetary gearset 16.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the seventh embodiment, only the structure of the first compound planetary gearset 4 is changed from the first embodiment. As the operation of the operating elements in each shift range is identical to that of the first embodiment, an explanation thereof will be omitted herein.

Eighth Embodiment

Figure 13:
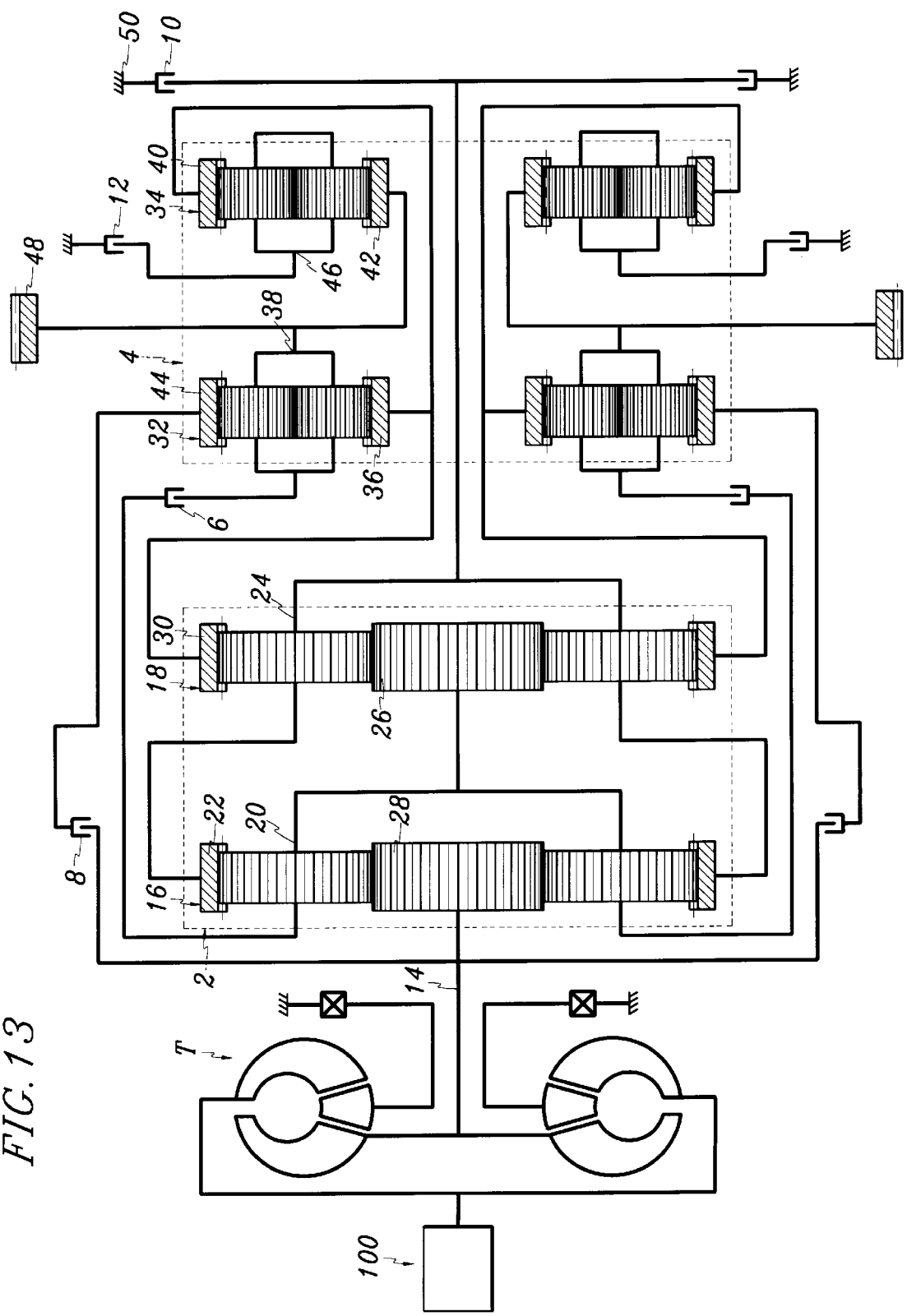
FIG. 13 is a schematic view of a powertrain according to an eighth preferred embodiment of the present invention.

Referring to FIG. 13, shown is a schematic view of a powertrain according to an eighth preferred embodiment of the present invention. In the eighth embodiment, the first and second compound planetary gearsets 16 and 18 are single pinion planetary gearsets. As shown in the drawing, the planet carrier 20 and ring gear 22 of the first simple planetary gearset 16 are fixedly connected respectively to the sun gear 26 and planet carrier 24 of the second simple planetary gearset 18.

Further, with regard to the combination of the first and second compound planetary gearsets 2 and 4, the ring gear 30 of the second simple planetary gearset 18 is fixedly connected to the sun gear 36 and ring gear 40 of the third and fourth simple planetary gearsets 32 and 34, both the planet carrier 20 and sun gear 26 of the first and second simple planetary gearsets 16 and 18 are variably connected to both the planet carrier 38 and sun gear 42 of the third and fourth simple planetary gearsets 32 and 34 through the first clutch 6, and the sun gear 28 of the first simple planetary gearset 16 is variably connected to the ring gear 44 of the third simple planetary gearset 32 through the second clutch 8.

Also, the ring gear 22 and planet carrier 24 of the first and second simple planetary gearsets 16 and 18 are connected to the transmission housing 50 with the first brake 10 interposed therebetween such that the ring gear 22 and planet carrier 24 can selectively act as reacting elements. In addition, the sun gear 28 of the first simple planetary gearset 16 acts as an input element.

According to the above structure, operating elements for the first compound planetary gearset 2 in the lever analogies of FIGS. 1–4 are as follows: the first operating element A indicates the sun gear 28 of the first simple planetary gearset 16, the second operating element B indicates a combination of the planet carrier 20 and sun gear 26 of the first and second simple planetary gearsets 16 and 18, the third operating element C indicates a combination of the ring gear 22 and planet carrier 24 of the first and second simple planetary gearsets 16 and 18, and the fourth operating element D indicates the ring gear 30 of the second simple planetary gearset 18.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the eighth embodiment, only the structure of the first compound planetary gearset 4 is changed from the first embodiment. As the operation of the operating elements in each shift range is identical to that of the first embodiment, an explanation thereof will be omitted herein.

Ninth Embodiment

Figure 14:
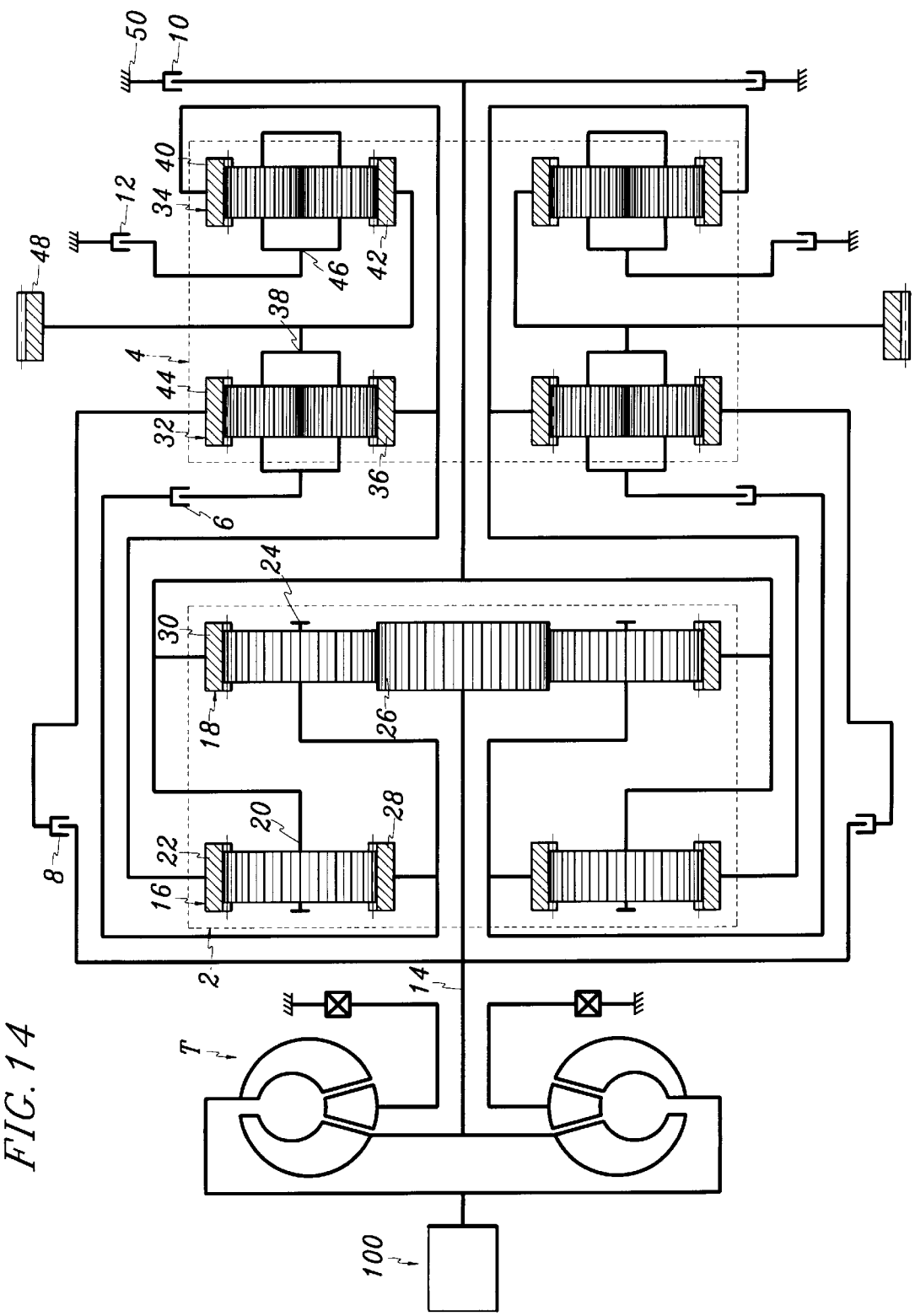
FIG. 14 is a schematic view of a powertrain according to a ninth preferred embodiment of the present invention.

Referring to FIG. 14, shown is a schematic view of a powertrain according to a ninth preferred embodiment of the present invention. In the ninth embodiment, the first and second compound planetary gearsets 16 and 18 are single pinion planetary gearsets. As shown in the drawing, the sun gear 28 and planet carrier 20 of the first simple planetary gearset 16 are fixedly connected respectively to the planet carrier 24 and ring gear 30 of the second simple planetary gearset 18.

Further, with regard to the combination of the first and second compound planetary gearsets 2 and 4, the ring gear 22 of the first simple planetary gearset 16 is fixedly connected to the sun gear 36 and ring gear 40 of the third and fourth simple planetary gearsets 32 and 34, both the sun gear 28 and planet carrier 24 of the first and second simple planetary gearsets 16 and 18 are variably connected to both the planet carrier 38 and sun gear 42 of the third and fourth simple planetary gearsets 32 and 34 through the first clutch 6, and the sun gear 26 of the second simple planetary gearset 18 is variably connected to the ring gear 44 of the third simple planetary gearset 32 through the second clutch 8.

Also, the planet carrier 20 and ring gear 30 of the first and second simple planetary gearsets 16 and 18 are connected to the transmission housing 50 with the first brake 10 interposed therebetween such that the planet carrier 20 and ring gear 30 can selectively act as reacting elements. In addition, the sun gear 26 of the second simple planetary gearset 18 acts as an input element.

According to the above structure, operating elements for the first compound planetary gearset 2 in the lever analogies of FIGS. 1–4 are as follows: the first operating element A indicates the sun gear 26 of the second simple planetary gearset 18, the second operating element B indicates a combination of the sun gear 28 and planet carrier 24 of the first and second simple planetary gearsets 16 and 18, the third operating element C indicates a combination of the planet carrier 20 and ring gear 30 of the first and second simple planetary gearsets 16 and 18, and the fourth operating element D indicates the ring gear 22 of the first simple planetary gearset 16.

The operating elements of the first compound planetary gearset 2 are connected to the operating elements of the second compound planetary gearset 4 identically as in the first embodiment. Namely, the fourth operating element D of the first compound planetary gearset 2 is fixedly connected to the third operating element I of the second compound planetary gearset 4, the second operating element B of the first compound planetary gearset 2 is variably connected to the first operating element G of the second compound planetary gearset 4, and the first operating element A of the first compound planetary gearset 2 is variably connected to the second operating element H of the second compound planetary gearset 4.

Here, input is realized through the first operating element A of the first compound planetary gearset 2, the third operating element C of the first compound planetary gearset 2 and the fourth operating element J of the second compound planetary gearset 4 selectively operate as reacting elements, and output is realized through the first operating element G of the second compound planetary gearset 4.

In the ninth embodiment, only the structure of the first compound planetary gearset 4 is changed from the first embodiment. As the operation of the operating elements in each shift range is identical to that of the first embodiment, an explanation thereof will be omitted herein.

In the powertrain for a 5-speed automatic transmission structured and operating as in the above, by eliminating an element rotating faster than a final output element needed in the prior art when in overdrive, power loss is minimized. Also, as the number of friction elements is reduced, the powertrain can be designed to be lightweight and compact in size.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A powertrain for a 5-speed automatic transmission comprising:

a first compound planetary gearset comprising first and second simple planetary gearsets having first, second, third and fourth operating elements, said first operating element acting as an input element;

a second compound planetary gearset comprising third and fourth simple planetary gearsets having fifth, sixth, seventh and eighth operating elements, said fifth operating element acting as an output element, said fifth and sixth operating elements being variably connected to said second and first operating elements, respectively, and said seventh operating element being fixedly connected to the third operating element;

clutch means for variably connecting said fifth and sixth operating elements to said second and first operating elements, respectively; and brake means for selectively connecting the fourth and eighth operating elements to a transmission housing.

2. The powertrain of claim 1, wherein each of said first and second simple planetary gearsets is a double pinion planetary gearset.

3. The powertrain of claim 2, wherein the first operating element is a sun gear of the first simple planetary gearset;

the second operating element is a combination of a ring gear of the first simple planetary gearset and a sun gear of the second simple planetary gearset;

the third operating element is a ring gear of the second simple planetary gearset; and the fourth operating element is a combination of a planet carrier of the first simple planetary gearset and a planet carrier of the second simple planetary gearset.

4. The powertrain of claim 3, wherein each of said third and fourth simple planetary gearsets is a double pinion planetary gearset.

5. The powertrain of claim 4, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

6. The powertrain of claim 5, wherein the clutch means comprises a first clutch interposed between a combination of the ring gear of the first simple planetary gearset and the sun gear of the second simple planetary gearset and a combination of the planet carrier of the third simple planetary gearset and the sun gear of the fourth simple planetary gearset, and a second clutch interposed between the sun gear of the first simple planetary gearset and the ring gear of the third simple planetary gearset.

7. The powertrain of claim 5, wherein the brake means comprises a first brake interposed between the ring gear of the second simple planetary gearset and the transmission housing and a second brake interposed between the planet carrier of the fourth simple planetary gearset and the transmission housing.

8. The powertrain of claim 2, wherein the first operating element is a sun gear of the first simple planetary gearset;

the second operating element is a combination of a ring gear of the first simple planetary gearset and a sun gear of the second simple planetary gearset;

the third operating element is a planet carrier of the first simple planetary gearset; and the fourth operating element is a planet carrier of the second simple planetary gearset.

9. The powertrain of claim 8, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

10. The powertrain of claim 9, wherein the clutch means comprises a first clutch interposed between the combination of the ring gear and sun gear of the first and second simple planetary gearsets and the combination of the planet carrier and sun gear of the third and fourth simple planetary gearsets, and a second clutch interposed between the sun gear of the first simple planetary gearset and the ring gear of the third simple planetary gearset.

11. The powertrain of claim 9, wherein the brake means comprises a first brake interposed between the planet carrier of the first simple planetary gearset and the transmission housing, and a second brake interposed between the planet carrier of the fourth simple planetary gearset and the transmission housing.

12. The powertrain of claim 2, wherein the first operating element is a sun gear of the second simple planetary gearset;

the second operating element is a combination of a sun gear of the first simple planetary gearset and a ring gear of the second simple planetary gearset;

the third operating element is a combination of a ring gear of the first simple planetary gearset and a planet carrier of the second simple planetary gearset; and the fourth operating element is a planet carrier of the first simple planetary gearset.

13. The powertrain of claim 12, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

14. The powertrain of claim 13, wherein the clutch means comprises a first clutch interposed between the combination of the sun gear and ring gear of the first and second simple planetary gearsets and the combination of the planet carrier and sun gear of the third and fourth simple planetary gearsets, and a second clutch interposed between the sun gear of the second simple planetary gearset and the ring gear of the third simple planetary gearset.

15. The powertrain of claim 13, wherein the brake means comprises a first brake interposed between the combination of the ring gear and planet carrier of the first and second simple planetary gearsets and the transmission housing, and a second brake interposed between the planet carrier of the fourth simple planetary gearset and the transmission housing.

16. The powertain of claim 1, wherein the first compound planetary gearset is a single pinion planetary gearset and the second compound planetary gearset is a double pinion planetary gearset.

17. The powertrain of claim 16, wherein the first operating element is a sun gear of the first simple planetary gearset;

the second operating element is a combination of a planet carrier of the first simple planetary gearset and a sun gear of the second simple planetary gearset;

the third operating element is a combination of ring gears of the first and second simple planetary gearsets; and the fourth operating element is a planet carrier of the second simple planetary gearset.

18. The powertrain of claim 17, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

19. The powertrain of claim 18, wherein the clutch means comprises a first clutch interposed between the combination of the planet carrier and sun gear of the first and second simple planetary gearsets and the combination of the planet carrier and sun gear of the third and fourth simple planetary gearsets, and a second clutch interposed between the sun gear of the first simple planetary gearset and the ring gear of the third simple planetary gearset.

20. The powertrain of claim 18, wherein the brake means comprises a first brake interposed between the combination of the ring gears of the first and second simple planetary gearsets and the transmission housing, and a second brake interposed between the planet carrier of the fourth simple planetary gearset and the transmission housing.

21. The powertrain of claim 16, wherein the first operating element is a sun gear of the second simple planetary gearset;

the second operating element is a combination of a sun gear of the first simple planetary gearset and a ring gear of the second simple planetary gearset;

the third operating element is a combination of planet carriers of the first and second simple planetary gearsets; and the fourth operating element is a ring gear of the second simple planetary gearset.

22. The powertrain of claim 21, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

23. The powertrain of claim 22, wherein the clutch means comprises a first clutch interposed between the combination of the sun gear and ring gear of the first and second simple planetary gearsets and the combination of the planet carrier and sun gear of the third and fourth simple planetary gearsets, and a second clutch interposed between the sun gear of the second simple planetary gearset and the ring gear of the third simple planetary gearset.

24. The powertrain of claim 22, wherein the brake means comprises a first brake interposed between the combination of the planet carriers of the first and second simple planetary gearsets and the transmission housing, and a second brake interposed between the planet carrier of the fourth simple planetary gearset and the transmission housing.

25. The powertrain of claim 1, wherein the first compound planetary gearset is a double pinion planetary gearset and the second compound planetary gearset is a single pinion planetary gearset.

26. The powertrain of claim 25, wherein the first operating element is a sun gear of the first simple planetary gearset;

the second operating element is a combination of a ring gear of the first simple planetary gearset and a sun gear of the second simple planetary gearset;

the third operating element is a combination of planet carriers of the first and second simple planetary gearsets; and the fourth operating element is a ring gear of the second simple planetary gearset.

27. The powertrain of claim 26, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

28. The powertrain of claim 27, wherein the clutch means comprises a first clutch interposed between the combination of the ring gear and sun gear of the first and second simple planetary gearsets and the combination of the planet carrier and sun gear of the third and fourth simple planetary gearsets, and a second clutch interposed between the sun gear of the first simple planetary gearset and the ring gear of the third simple planetary gearset.

29. The powertrain of claim 27, wherein the brake means comprises a first brake interposed between the combination of the planet carriers of the first and second simple planetary gearsets and the transmission housing, and a second brake interposed between the planet carrier of the fourth simple planetary gearset and the transmission housing.

30. The powertrain of claim 25, wherein the first operating element is a sun gear of the second simple planetary gearset;

the second operating element is a combination of a sun gear of the first simple planetary gearset and a planet carrier of the second simple planetary gearset;

the third operating element is a combination of ring gears of the first and second simple planetary gearsets; and the fourth operating element is a planet carrier of the second simple planetary gearset.

31. The powertrain of claim 30, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

32. The powertrain of claim 31, wherein the clutch means comprises a first clutch interposed between the combination of the sun gear and planet carrier of the first and second simple planetary gearsets and the combination of the planet carrier and sun gear of the third and fourth simple planetary gearsets, and a second clutch interposed between the sun gear of the second simple planetary gearset and the ring gear of the third simple planetary gearset.

33. The powertrain of claim 31, wherein the brake means comprises a first brake interposed between the combination of the ring gears of the first and second simple planetary gearsets and the transmission housing, and a second brake interposed between the planet carrier of the fourth simple planetary gearset and the transmission housing.

34. The powertrain of claim 1, wherein each of the first and second simple planetary gearsets is a single pinion planetary gearsets.

35. The powertrain of claim 34, wherein the first operating element is a sun gear of the first simple planetary gearset;

the second operating element is a combination of a planet carrier of the first simple planetary gearset and a sun gear of the second simple planetary gearset;

the third operating element is a combination of ring gears of the first and second simple planetary gearsets; and the fourth operating element is a ring gear of the second simple planetary gearset.

36. The powertrain of claim 35, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

37. The powertrain of claim 36, wherein the clutch means comprises a first clutch interposed between the combination of the planet carrier and sun gear of the first and second simple planetary gearsets and the combination of the planet carrier and sun gear of the third and fourth simple planetary gearsets, and a second clutch interposed between the sun gear of the first simple planetary gearset and the ring gear of the third simple planetary gearset.

38. The powertrain of claim 36, wherein the brake means comprises a first brake interposed between the combination of the ring gears of the first and second simple planetary gearsets and the transmission housing, and a second brake interposed between the planet carrier of the fourth simple planetary gearset and the transmission housing.

39. The powertrain of claim 34, wherein the first operating element is a sun gear of the second simple planetary gearset;

the second operating element is a combination of a sun gear of the first simple planetary gearset and a planet carrier of the second simple planetary gearset;

the third operating element is a combination of planet carriers of the first and second simple planetary gearsets; and the fourth operating element is a ring gear of the first simple planetary gearset.

40. The powertrain of claim 39, wherein the fifth operating element is a combination of a planet carrier of the third simple planetary gearset and a sun gear of the fourth simple planetary gearset;

the sixth operating element is a ring gear of the third simple planetary gearset;

the seventh operating element is a combination of a sun gear of the third simple planetary gearset and a ring gear of the fourth simple planetary gearset; and the eighth operating element is a planet carrier of the fourth simple planetary gearset.

41. The powertrain of claim 40, wherein the clutch means comprises a first clutch interposed between the combination of the sun gear and planet carrier of the first and second simple planetary gearsets and the combination of the planet carrier and sun gear of the third and fourth simple planetary gearsets, and a second clutch interposed between the sun gear of the second simple planetary gearset and the ring gear of the third simple planetary gearset.

42. The powertrain of claim 40, wherein the brake means comprises a first brake interposed between the combination of the planet carrier and ring gear of the first and second simple planetary gearsets and the transmission housing, and a second brake interposed between the planet carrier of the fourth simple planetary gearset and the transmission housing.

* * * * *